S. SCHRANTZ.
FLYTRAP.
APPLICATION FILED MAY 19, 1919.

1,313,837.

Patented Aug. 19, 1919.

WITNESSES

INVENTOR
SAMUEL SCHRANTZ

BY
ATTORNEYS

UNITED STATES PATENT OFFICE.

SAMUEL SCHRANTZ, OF ST. LOUIS, MISSOURI.

FLYTRAP.

1,313,837.

Specification of Letters Patent. Patented Aug. 19, 1919.

Application filed May 19, 1919. Serial No. 298,230.

*To all whom it may concern:*

Be it known that I, SAMUEL SCHRANTZ, a citizen of the United States, and a resident of St. Louis, and State of Missouri, have invented certain new and useful Improvements in Flytraps, of which the following is a specification.

This invention relates to an improvement in fly traps, and one of the principal objects thereof is to provide an improved trap having a chamber in which the flies are trapped, which chamber may readily be removed for immersion in boiling water or other liquid for killing the trapped insects.

Another object of the invention is to provide an improved fly trap which will be exceedingly simple, durable, efficient in operation and inexpensive to manufacture and maintain.

With these and other objects in view, which will become apparent as the description proceeds, the invention resides in the construction, combination and arrangement of parts hereinafter more fully described and claimed, and illustrated in the accompanying drawing in which like characters of reference indicate like parts throughout the several figures of which:

Figure 1:
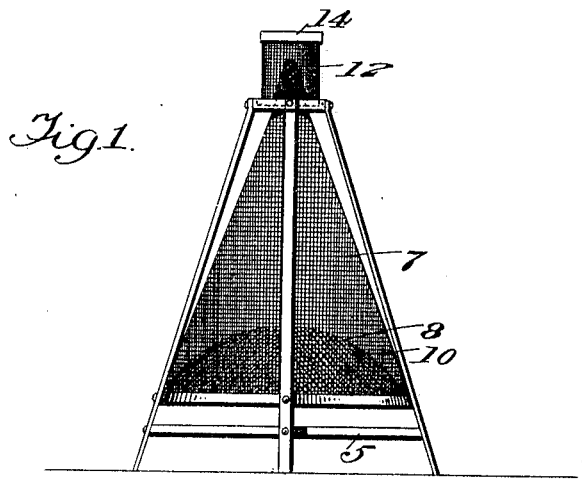
Figure 1 represents an elevational view of a fly trap constructed according to my invention.
Figure 4:
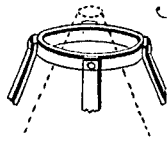
Fig. 4 represents a fragmentary perspective view of the trap, the chamber for confining the flies being removed.
Figure 2:
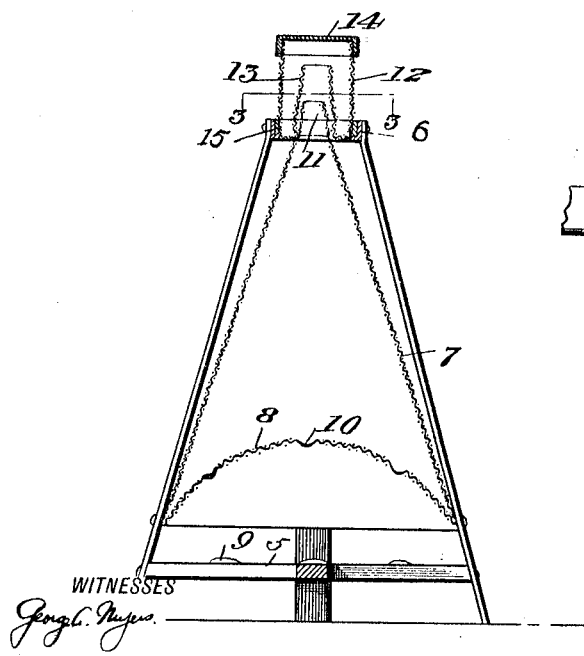
Fig. 2 represents a vertical sectional view thereof.
Figure 3:
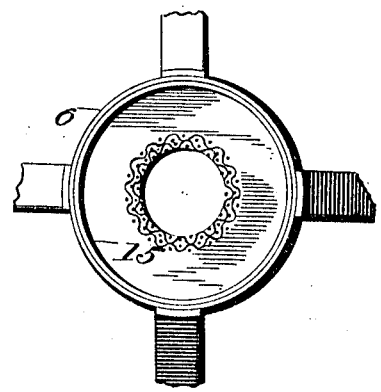
Fig. 3 represents a sectional view taken on the plane indicated by the line 3—3 of Fig. 2.

Referring more particularly to the drawing, the supporting frame of the trap includes a tripod, the legs of which are braced at their lower ends by the cross braces 5, and are connected at their upper ends to a ring 6. A funnel 7 made of suitable wire netting is mounted within the frame and is closed at its lower and larger end by a concavo-convex closure 8 of wire netting. The funnel is mounted above the cross braces 5 and these braces may serve as means on which suitable bait, indicated at 9, may be deposited for the purpose of attracting the insects, such as flies, moths, etc.

The closure 8 is provided with a plurality of openings 10 through which the insects find their way to the funnel 7.

The upper end of the funnel forms a restricted exit 11 through which the insects pass in finding their way to the chamber 12 in which they are trapped.

This chamber is cylindrical and is formed of wire netting. The bottom of the chamber is formed with an inwardly extending funnel-shaped entrance 13, which when the chamber is in place fits over the exit 11 of the funnel 7 forming an extension thereof. The upper end of the chamber is closed by a removable cover 14. A ring 15 encircles the lower ends of the chamber and removably fits within the ring 6 when the chamber is in place on the trap.

The insects attracted by the bait will alight on the under surface of the closure 8, and in crawling about will pass through the openings 10 which are relatively small, into the funnel 7. In endeavoring to escape from the funnel they will crawl up the sides thereof and make their way into the chamber 12 through the entrance 13. This entrance is restricted so that the insects will not pass down through the same in attempting to escape from the chamber.

When the chamber has become filled with the insects it may be lifted bodily off of the trap and immersed in boiling water or other liquid for killing the insects. The dead insects may be dumped from the chamber by simply removing the cover 14 and turning the chamber up side down. The cover may then be replaced and the chamber be placed on the trap. The latter is then again ready for use.

The trap, while intended primarily for the extermination of flies in houses, lunch rooms and the like, may be used in gardens and the like for catching moths and other insects.

The trap is particularly effective, by reason of the fact that the light may percolate through it in all directions. There is, therefore, no dark passage or opening through which the insects must pass in reaching the chamber, and hence they will more readily enter the chamber in endeavoring to find their way from the trap.

Although I have described the preferred embodiment of my invention, I may desire to make such changes in the construction, combination and arrangement of parts thereof, as do not depart from the spirit of the invention and the scope of the appended claim.

I claim:—

A fly trap comprising a supporting frame including a plurality of upwardly converging supports, a ring secured to the upper ends of said supports, cross bars secured to the lower portions of said supports and adapted to support bait, a conical member of wire screen secured within said frame and having its upper end open and extending above said ring, an upwardly extending bottom closure for said conical member provided with a plurality of holes, and a chamber member detachably engaged upon the upper end of said frame and including a ring removably engaging said first named ring, a cylindrical screen portion secured to said second named ring, a detachable cover for said cylindrical portion, and an upwardly extending funnel-shaped portion formed upon the lower end of said cylindrical portion and disposed in spaced relation to the wall thereof and in encircling relation to the upper end of said conical member.

SAMUEL SCHRANTZ.